US005916251A

United States Patent [19]

Sibik

[11] Patent Number: 5,916,251

[45] Date of Patent: Jun. 29, 1999

[54] STEAM FLOW REGULATION IN AN ABSORPTION CHILLER

[75] Inventor: Lee Louis Sibik, Onalaska, Wis.

[73] Assignee: Gas Research Institute, Chicago, Ill.

[21] Appl. No.: 08/959,666

[22] Filed: Oct. 29, 1997

[51] Int. Cl.[6] .......... F25B 15/00

[52] U.S. Cl. .......... 62/148; 62/497

[58] Field of Search .......... 62/141, 148, 476, 62/497, 101

[56] References Cited

U.S. PATENT DOCUMENTS

| | | | |
|---|---|---|---|
| 2,502,104 | 3/1950 | Reid | 62/148 |
| 3,002,359 | 10/1961 | Miner | 62/148 |
| 3,813,037 | 5/1974 | Bekedam | 237/9 R |
| 4,187,543 | 2/1980 | Healey et al. | 364/505 |
| 4,373,663 | 2/1983 | Hammer | 236/15 R |
| 4,505,123 | 3/1985 | Kusakabe et al. | 62/148 |
| 4,554,223 | 11/1985 | Yokoyama et al. | 429/20 |
| 4,577,280 | 3/1986 | Putman | 364/494 |
| 5,138,846 | 8/1992 | Ogawa et al. | 62/148 |
| 5,224,352 | 7/1993 | Arima et al. | 62/141 |
| 5,289,868 | 3/1994 | Koseki et al. | 165/14 |
| 5,423,189 | 6/1995 | Nicol et al. | 62/141 |
| 5,477,696 | 12/1995 | Takahata et al. | 62/148 |
| 5,557,939 | 9/1996 | Mizukami et al. | 62/148 |
| 5,586,447 | 12/1996 | Sibik et al. | 62/141 |
| 5,617,733 | 4/1997 | Tomita et al. | 62/324.2 |
| 5,619,859 | 4/1997 | Takigawa et al. | 62/148 |

*Primary Examiner*—William Doerrler
*Attorney, Agent, or Firm*—Pauley Petersen Kinne & Fejer

[57] ABSTRACT

A method for regulating energy consumption by a steam-fired absorption chiller having a steam control valve for controlling steam flow to the generator in which the steam pressure upstream of the steam control valve is measured as well as the steam pressure downstream of the steam control valve. Using the steam pressure data, chiller size, COP of the chiller, valve size and valve type of the steam control valve, the desired steam control valve position for the steam control valve is calculated by means of an algorithm using said data. The output of the algorithm is then used to adjust the steam control valve to the desired steam control valve position.

10 Claims, 2 Drawing Sheets

STEAM FLOW REGULATION IN AN ABSORPTION CHILLER

BACKGROUND OF THE INVENTION

1. Field of the Invention

This invention relates to a method and apparatus for regulating energy consumption by a steam-fired absorption chiller. More particularly, this invention relates to a method for adjusting the steam control valve of a steam-fired absorption chiller so as to minimize or eliminate fluctuations in steam flow rate which are common in conventional steam-fired absorption chillers.

2. Description of Prior Art

Absorption chiller systems are well established in the prior art. In such systems, an absorbent-refrigerant solution from an absorber is heated in a generator to produce an absorbent-refrigerant vapor. The absorbent-refrigerant vapor is separated and condensed, producing a substantially pure liquid refrigerant and an absorbent-enriched solution, that is, a regenerated absorbent-refrigerant solution. The absorbent-enriched solution is circulated through a heat exchanger in heat exchange relationship with the absorbent-refrigerant solution from the absorber, preheating the absorbent-refrigerant solution before its introduction into the generator and producing a reduced temperature absorbent-enriched solution, which reduced temperature absorbent-enriched solution is returned to the absorber. The substantially pure liquid refrigerant is evaporated, producing a substantially pure refrigerant vapor, and the substantially pure refrigerant vapor is absorbed into the reduced temperature absorbent-enriched solution in the absorber, producing the absorbent-refrigerant solution.

In absorption chillers, there are three common energy sources for heating the generator-direct fired, hot water, and steam-fired. Energy supplied to the generator concentrates the absorbent solution and separates out refrigerant. The amount of energy required is dependent upon the absorbent-refrigerant solution concentration entering the generator, the solution flow, and the desired concentration of the absorbent-enriched solution leaving the generator. For steam-fired chillers, energy is obtained from the phase transformation of steam from vapor to liquid. The heat of vaporization is transferred to the cooler absorbent-refrigerant solution in the generator by conduction through generator tube surfaces. Energy transferred is proportional to steam flow rate. Steam flow into the generator is a function of supply pressure, saturation pressure in the generator, and steam valve position.

The challenge in controlling a steam-fired absorption chiller is in the regulation of steam flow to the generator. Steam supply pressure is usually held constant by a steam regulator; however, there are cases when supply pressure fluctuates significantly. On the downstream side of the steam control valve, steam saturation pressure in the generator is always changing. This pressure varies the chiller capacity and is very low at startup and when the chiller is running with cold cooling water temperatures. The result of low generator pressure is that the differential pressure across the steam control valve is large. When this pressure differential is large, it is possible to get steam flows greater than design capacity. This, in turn, can cause two problems. The first problem is that the boiler supplying steam to the unit may not be capable of producing more than the designed steam flow rate. The second problem is that the excess steam flow may overfire the chiller.

Historically, empirical methods have been used to determine steam valve travel limits at startup and at low cooling water temperatures to limit steam flow. However, this method is not exact, and there is no compensation for fluctuating steam supply pressure.

U.S. Pat. No. 5,477,696 teaches a device for adjusting the opening degree of a burning quantity control valve which controls heat supplied to a generator in order to control the amount of heat provided to a solution therein during cooling cycle operation. The device includes detector means for sensing a temperature of the solution heated and concentrated in the generator, detector means for sensing the inlet or outlet temperature of chilled water flowing into or out of the evaporator, detector means for sensing the inlet or outlet temperature of cooling water which is fed from the absorber to the condenser, and detector means for picking up an opening degree of the burning quantity control valve which supplies the heat source to the generator to obtain a present heating quantity of the machine in operation.

U.S. Pat. No. 5,619,859 teaches a double effect absorption refrigeration unit which uses water as a refrigerant and an aqueous solution of lithium bromide as an absorbent solution, respectively, and comprises an evaporator, an absorber, a high temperature generator, a low temperature generator, and a condenser. The maximum permissible temperature of the high temperature generator is determined by an inlet temperature of the cooling water while the amount of heat is controlled according to variations of cooling load, such as an outlet temperature of cooled water. When the temperature in the high temperature generator exceeds the maximum permissible temperature as determined by the inlet temperature of the cooling water, the amount of heat primarily determined by the cooling load is reduced. The absorption refrigeration unit insures adequate control at the time of startup, achieves energy-saving by suppressing a surplus refrigerating capacity when the cooling water is low in temperature, and avoids the pressure rise in the high temperature generator, irrespective of the temperature of the cooling water, when an abnormality occurs, such as in the case of a large amount of hydrogen gas being generated.

U.S. Pat. No. 3,813,037 teaches a closed condensate system for steam in which the steam from a boiler is used in various applications including air conditioning, where all of the steam from the boiler is used and all of the condensate from the steam can be returned to the boiler. A closed cycle condensate receiver is used in the system and means are employed for maintaining a pressure within the receiver so that the temperature of the condensate returned to the receiver will always be lower than the corresponding pressure within the receiver, thereby assuring that the closed condensate system returns the condensate from the heat exchanging elements of the system back to the boiler without flash loss.

U.S. Pat. No. 4,187,543 teaches an apparatus for controlling the discharge temperature of thermal fluids presented from a common thermal source to one or more HVAC systems in a network whereby each HVAC controls the volume of thermal fluid circulating therethrough by regulating the valve position of the HVAC valve apparatus over a valve position range from a fully closed position to a fully open position dependent upon the thermal energy level required by one or more temperature regulated living spaces associated with each HVAC. The apparatus includes electronic processing means in combination with dedicated temperature and valve position sensing apparatus for providing actual position signals for each fluid valve apparatus and an actual source discharge temperature signal. The electronic processing means determines the magnitude of the greatest thermal energy demand within a short term interval dependent upon the most open of the actual valve position signals and provides modulation of the source discharge temperature over the short term interval dependent upon the magnitude of the greatest thermal energy demand.

A control system for transfer of energy to and from a working fluid in which a pressure sensor determines the condition of the working fluid which is then used to regulate a fuel burner is taught by U.S. Pat. No. 4,373,663. See also U.S. Pat. No. 4,577,280 which teaches a system for controlled distribution of steam from various pressure lines for energy management and/or for steam-power cogeneration in an industrial plant; U.S. Pat. No. 5,138,846 which teaches a system for controlling the cold water outlet temperature of an absorption refrigerator by fuzzy logic control; U.S. Pat. No. 5,224,352 which teaches a control device for an absorption refrigeration machine which maintains constant a liquid surface of a generator with respect to start and stop or abrupt variation of load of the absorption refrigeration machine using fuzzy logic control; U.S. Pat. No. 5,289,868 which teaches an absorption chiller heater and unit-type air conditioning system provided with load responsive type control means for performing cooling and heating operation control in accordance with a load; U.S. Pat. No. 5,423,189 which teaches a control system for an absorption heat transfer plant comprising means for controlling the supply of heat to the concentrator responsive to the temperature of the evaporator liquid refrigerant and means for controlling the temperature of a cooling fluid which cools the heat transfer plant's absorber and condenser and which maintains the cooling fluid at an optimum temperature as the cooling fluid enters the absorber; and U.S. Pat. No. 5,557,939 which teaches a control system for absorption chillers comprising a device for measuring operating state data concerning components of the main assembly of the chiller including the liquid level of a high temperature generator and the degree of opening of a gas valve, and a fuzzy control circuit for calculating the deviation of the liquid level from a target value based upon the measured operating state data, predicting a variation in the liquid level from the deviation and another item of the operating state data and calculating a control input as to the inverter frequency of an absorbent pump based upon the result of prediction, whereby, even in the event of a great disturbance, the liquid level of the generator can be controlled with high responsiveness to minimize the variation of the liquid level.

SUMMARY OF THE INVENTION

It is an object of this invention to provide a method for regulating energy consumption by a steam-fired absorption chiller.

It is another object of this invention to provide a method for controlling steam flow in a steam-fired absorption chiller.

It is yet another object of this invention to provide a steam-fired absorption chiller equipped with a system for automatically controlling steam flow therethrough.

These and other objects of this invention are achieved by a method for regulating energy consumption and/or controlling steam flow in a steam-fired absorption chiller comprising the steps of measuring an upstream steam pressure upstream of a steam control valve, measuring either the downstream steam pressure downstream of the steam control valve or the steam pressure drop across the steam control valve, determining the chiller size and coefficient of performance (COP) of the chiller, determining the valve size and valve type of the steam control valve, calculating a desired steam control valve position for the steam control valve using an algorithm employing the upstream steam pressure, the downstream steam pressure or the steam pressure drop across the steam control valve, the chiller size, COP, valve size, and valve type, and adjusting the steam control valve to the desired steam control valve position.

An absorption chiller for carrying out the method of this invention comprises an absorber, a generator in fluid communication with the absorber, a condenser in fluid communication with the generator, an evaporator in fluid communication with the condenser and the absorber, and heating means in the form of a steam supply for heating the generator. The steam control valve is provided disposed between the steam supply and the generator and a first pressure transducer disposed upstream of the steam control valve is provided for measuring the upstream steam pressure. A second pressure transducer for measuring steam pressure downstream of the steam control valve is disposed downstream of the steam control valve. The chiller further comprises adjustment means for adjusting the steam control valve, which adjustment means comprises means for calculating a desired steam control valve position for the steam control valve with an algorithm using the upstream steam pressure, the downstream steam pressure, chiller size and COP of the absorption chiller, and valve size and valve type of the steam control valve.

In accordance with one preferred embodiment of this invention, rather than a second pressure transducer disposed downstream of the steam control valve, a differential pressure transducer is used for measuring the steam pressure drop across the steam control valve. In this case, the algorithm employs the steam pressure drop across the steam control valve as a basis for adjusting the steam control valve.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
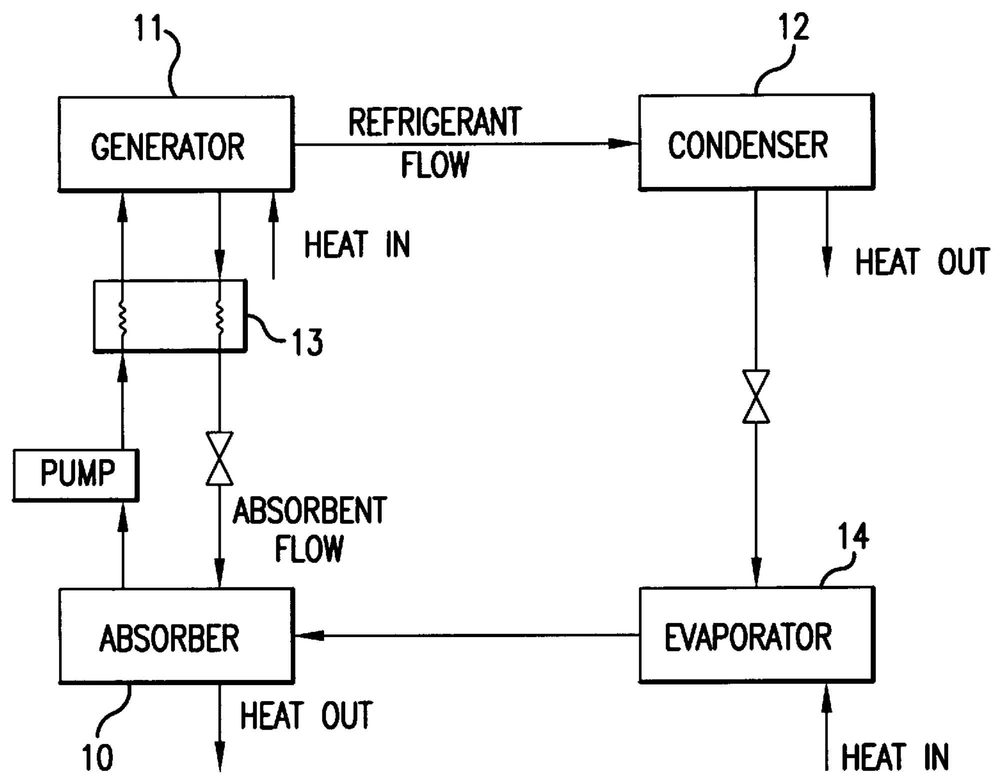
FIG. 1 is a schematic diagram of a typical known absorption chiller system.

FIG. 1 shows a schematic diagram of a typical absorption cooling process in which an absorbent-refrigerant solution from absorber 10 is heated in generator 11 producing an absorbent-refrigerant vapor. The absorbent-refrigerant vapor is separated, the refrigerant portion thereof being condensed in condenser 12, producing a substantially pure liquid refrigerant. The absorbent vapor portion of the absorbent-refrigerant vapor is returned to generator 11, forming an absorbent-enriched, that is strong, solution which is circulated through heat exchanger 13 in heat exchange relationship with absorbent-refrigerant solution from absorber 10. In this manner, the absorbent-refrigerant solution from absorber 10 is preheated before entering generator 11 and the absorbent-enriched solution from generator 11 is reduced in temperature. The reduced temperature absorbent-enriched solution is then returned to absorber 10 in which pure refrigerant vapor from evaporator 14 is absorbed into the reduced temperature absorbent-enriched solution, producing the absorbent-refrigerant solution which is then circulated to generator 11 to begin the cycle again.

Figure 2:
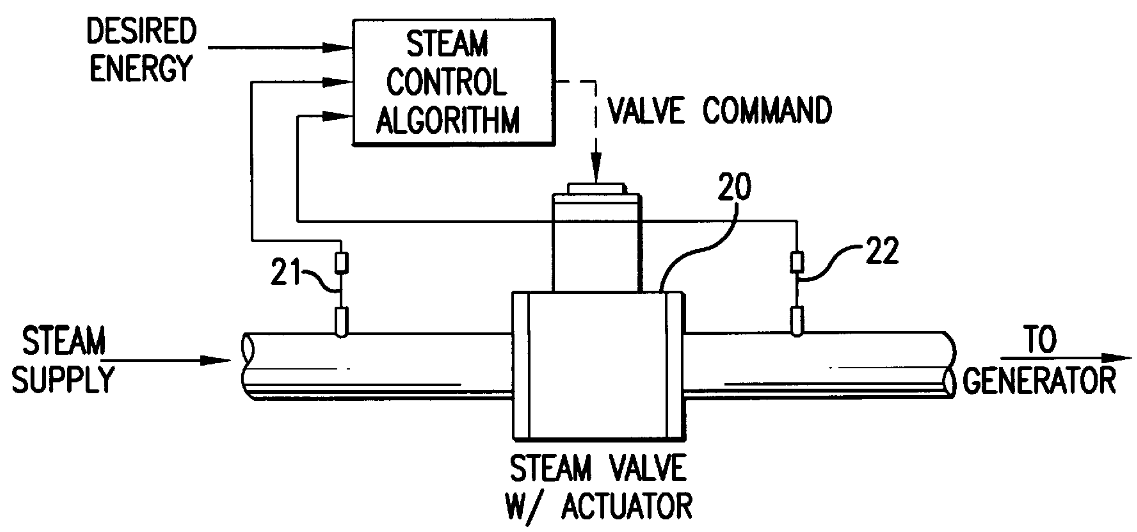
FIG. 2 is a diagram showing the manner in which the algorithm employed in this invention is applied to control of a steam control valve which, in turn, controls steam flow to the generator of the chiller.

Three common energy sources are used for providing heat to generator 11—direct fired, hot water, and steam fired. This invention utilizes an algorithm which is designed to set and regulate energy input into a steam-fired absorption chiller by controlling steam flow rate. The required energy is determined by converting a non-dimensional command to thermal units using an estimation of energy requirements based on chiller size. Energy is regulated by adjusting the valve position of steam valve 20, shown in FIG. 2, in response to steam supply 21 or valve discharge pressure 22 variations. As can be seen in FIG. 2, the steam control algorithm directly controls the rate at which steam enters generator 11. The desired energy command may be generated by any suitable means, such as temperature margin control or a capacity control algorithm. However, implementation of this invention is not dependent on the manner in which the desired energy command is generated. The other inputs to the steam control algorithm are pressure measurements from upstream 21 of steam control valve 20 and downstream 22 of steam control valve 20. In accordance with another embodiment of the method of this invention, upstream steam pressure 21 and the pressure drop across steam valve 20 as measured by a differential pressure transducer are employed as inputs to the steam control algorithm. The algorithm uses these measurements to compute a desired steam valve position. A command is then sent to a valve actuator which positions the valve.

Figure 3:
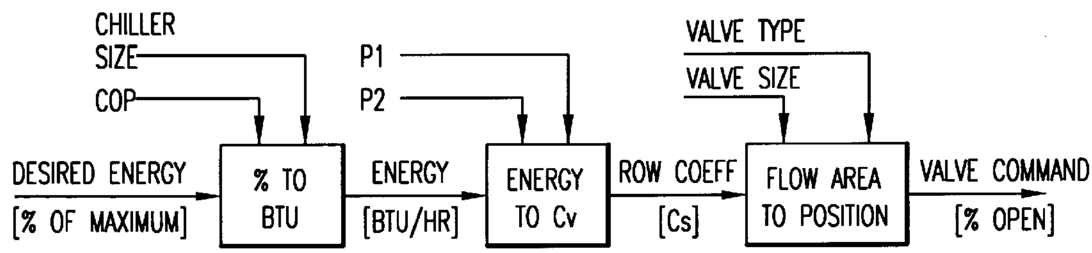
FIG. 3 is a schematic diagram showing the steam flow control algorithm in block diagram form.

FIG. 3 is a diagram showing the steam flow control algorithm of this invention in block diagram form. In addition to steam pressure upstream and downstream of steam control valve 20, the algorithm uses four additional elements to calculate steam flow, namely chiller size, coefficient of performance (COP), steam valve size, and steam valve type. This information is set by the user to match the actual configuration of the chiller.

In the first block of the steam flow control algorithm as shown in FIG. 3, the desired energy command, which has non-dimensional units, is converted to a desired energy flow rate in BTU/hr in accordance with the following equation:

$$\text{Energy} = \text{Nominal\_unit\_capacity} * \frac{200}{COP} * \frac{60}{100} * \text{Command [Btu/hr]}$$

Where

Command=% of maximum design energy input

COP~coefficient of performance (0.6 for single stage, 1.2 for two-stage chillers)

Nominal unit capacity=chiller size in tons

In the next block, energy flow is converted to a desired valve flow coefficient, $C_S$. This conversion utilizes upstream steam supply pressure 21 and either downstream steam pressure 22 or differential pressure ΔP. Using measured pressure and the desired steam flow from equation (1) above, the valve flow coefficient is determined in accordance with the following equations:

$$x = \frac{6000}{C_1} * \sqrt{\frac{\Delta P}{P_1}} \text{ [radians]}$$

-continued $$\text{if } (x > 1.5708)\ x = 1.5708$$

$$C_s = \frac{\text{Energy}}{P_1 * \sin x * h}$$

Where

Energy=calculated in equation 1

$C_1 = {}^{C_g}/_{C_v}$=ratio of gas to liquid sizing coefficients $P_1$=Steam supply pressure [psia]

$\Delta P = P_1 - P_2$=Pressure difference across valve [psid]

h=enthalpy of stream supply [BTU/lbm]

In the final step, $C_S$ is converted to a valve position which can be done either by look up in a table or by use of a polynomial curve fit of the valve data, $C_1$ and $C_S$.

Figure 4:
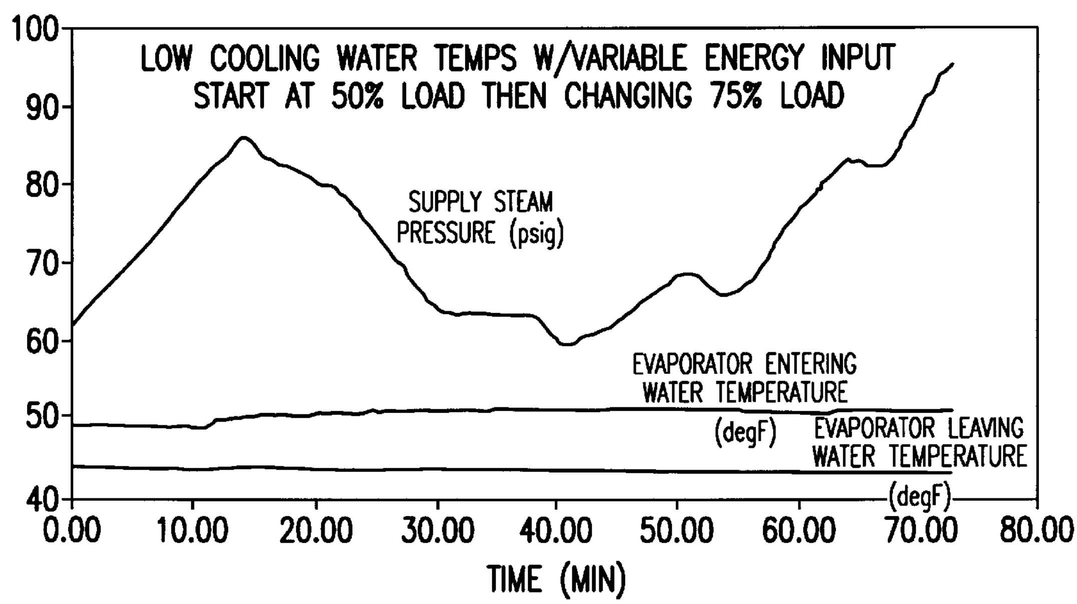
FIG. 4 is a graphic representation showing the effect of steam supply pressure on chiller capacity control.

Direct control of steam flow in accordance with the method and apparatus of this invention guarantees that steam consumption will not exceed the maximum desired flow rate under any condition. This function replaces the startup demand limit used in connection with known absorption chiller controls. It provides superior protection for marginally sized boilers because it is active all the time, but it does not interfere with normal operation of the chiller. Steam flow control in accordance with the method and apparatus of this invention will compensate for variations in steam supply pressure or generator pressure variations at chiller startup or low cooling water temperatures, an example of which is shown in FIG. 4. The data shown in FIG. 4 are taken from a test run where steam supply pressure varied substantially from the normal steam supply pressure of 120 psig. In the test, chiller load was increased from 50% to 75% of the maximum load while steam pressure was fluctuating. Steam flow control compensates for variations in steam pressure by adjusting the steam valve position. It can be seen that the variations in steam supply pressure have no effect on chiller capacity control.

Steam flow control in accordance with the method of this invention also provides the chiller with better carryover protection and improved crystallization temperature margin control. Field setup of the chiller is simplified because energy valve end stops are automatically set by the inputs from a machine configuration table, that is, unit size in tons, valve size in inches, and valve type (V-ball or butterfly). Steam flow control in accordance with this invention is possible because of the addition of two factory mounted pressure transducers on the steam line. In addition to steam flow control, steam pressure measurements are valuable pieces of information to a service technician or plant operator and are available on the user interface.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method for regulating energy consumption by a steam-fired absorption chiller comprising:

determining a desired energy input;

measuring an upstream steam pressure upstream of a steam control valve;

measuring one of a downstream steam pressure downstream of said steam control valve and a steam pressure drop across said steam control valve;

determining a chiller size and COP of said chiller and a valve size and a valve type of said steam control valve;

calculating a desired steam control valve position for said steam control valve with an algorithm using said upstream steam pressure, said one of said downstream steam pressure downstream of said steam control valve and said steam pressure drop across said steam control valve, and said chiller size, COP, valve size and valve type; and adjusting said steam control valve to said desired steam control valve position.

2. A method in accordance with claim 1, wherein said algorithm comprises the steps of determining a desired energy flow rate using said chiller size and said COP, determining a desired steam valve flow coefficient using said upstream steam pressure and said one of said downstream steam pressure and said pressure drop across said steam control valve, and converting said desired valve flow coefficient to a valve position.

3. In an absorption cooling process in which an absorbent-refrigerant solution from an absorber is heated in a generator producing an absorbent-refrigerant vapor, said absorbent-refrigerant vapor is separated and condensed producing a substantially pure liquid refrigerant and an absorbent-enriched solution, said absorbent-enriched-enriched solution is circulated through a heat exchanger in heat exchange relationship with said absorbent-refrigerant solution from said absorber producing a reduced temperature absorbent-enriched solution, said reduced temperature absorbent-enriched solution is returned to said absorber, said substantially pure liquid refrigerant is evaporated producing a substantially pure refrigerant vapor, and said substantially pure refrigerant vapor is absorbed into said reduced temperature absorbent-enriched solution producing said absorbent-refrigerant solution, and wherein heat is supplied to said generator as steam, the improvement comprising:

determining a desired energy input;

measuring an upstream steam pressure upstream of a steam control valve;

measuring one of a downstream steam pressure downstream of said steam control valve and a steam pressure drop across said steam control valve;

determining a chiller size and COP of said chiller and a valve size and a valve type of said steam control valve;

calculating a desired steam control valve position for said steam control valve with an algorithm using said upstream steam pressure, said one of said downstream steam pressure downstream of said steam control valve and said steam pressure drop across said steam control valve, and said chiller size, COP, valve size and valve type; and adjusting said steam control valve to said desired steam control valve position.

4. A method in accordance with claim 3, wherein said algorithm comprises the steps of determining a desired energy flow rate using said chiller size and said COP, determining a desired steam valve flow coefficient using said upstream steam pressure and said one of said downstream steam pressure and said pressure drop across said steam control valve, and converting said desired valve flow coefficient to a valve position.

5. A process in accordance with claim 3, wherein said steam control valve is adjusted by valve control means for controlling said steam control valve, said valve control means controlling said steam control based upon an output of said algorithm.

6. A process for controlling steam flow in a steam-fired absorption chiller comprising the steps of:

determining a desired energy input;

measuring an upstream steam pressure upstream of a steam control valve;

measuring one of a downstream steam pressure downstream of said steam control valve and a steam pressure drop across said steam control valve;

determining a chiller size and COP of said chiller and a valve size and a valve type of said steam control valve;

calculating a desired steam control valve position for said steam control valve with an algorithm using said upstream steam pressure, said one of said downstream steam pressure downstream of said steam control valve and said steam pressure drop across said steam control valve, and said chiller size, COP, valve size and valve type; and adjusting said steam control valve to said desired steam control valve position.

7. A process in accordance with claim 6, wherein said algorithm comprises the steps of determining a desired energy flow rate using said chiller size and said COP, determining a desired steam valve flow coefficient using said upstream steam pressure and said one of said downstream steam pressure and said pressure drop across said steam control valve, and converting said desired valve flow coefficient to a valve position.

8. A process in accordance with claim 6, wherein said steam control valve is adjusted by valve control means for controlling said steam control valve, said valve control means controlling said steam control based upon an output of said algorithm.

9. In an absorption chiller comprising an absorber, a generator in fluid communication with said absorber, a condenser in fluid communication with said generator, an evaporator in fluid communication with said condenser and said evaporator, and heating means for heating said generator, the improvement comprising:

said heating means comprising a steam supply;

a steam control valve disposed between said steam supply and said generator;

a first pressure transducer means for measuring an upstream steam pressure upstream of said steam control valve;

one of a second pressure transducer means for measuring a downstream steam pressure downstream of said steam control valve and a differential pressure transducer means for measuring a steam pressure drop across said steam control valve; and adjustment means for adjusting said steam control valve, said adjustment means comprising means for calculating a desired steam control valve position for said steam control valve with an algorithm using said upstream steam pressure, said one of said downstream steam pressure downstream of said steam control valve and said steam pressure drop across said steam control valve, and a chiller size and a COP of said absorption chiller and a valve size and a valve type of said steam control valve.

10. An absorption chiller in accordance with claim 9, wherein said algorithm comprises determining a desired energy flow rate using said chiller size and said COP, determining a desired steam valve flow coefficient using said upstream steam pressure and said one of said downstream steam pressure and said pressure drop across said steam control valve, and converting said desired valve flow coefficient to a valve position.

* * * * *